United States Patent
Lee et al.

(10) Patent No.: US 11,764,354 B2
(45) Date of Patent: Sep. 19, 2023

(54) NEGATIVE ELECTRODE ACTIVE MATERIAL, METHOD OF PREPARING THE SAME, AND NEGATIVE ELECTRODE AND LITHIUM SECONDARY BATTERY WHICH INCLUDE THE NEGATIVE ELECTRODE ACTIVE MATERIAL

(71) Applicant: LG CHEM, LTD., Seoul (KR)

(72) Inventors: Su Min Lee, Daejeon (KR); Je Young Kim, Daejeon (KR); Yong Ju Lee, Daejeon (KR); Sun Young Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 374 days.

(21) Appl. No.: 16/771,350

(22) PCT Filed: Feb. 27, 2019

(86) PCT No.: PCT/KR2019/002385
§ 371 (c)(1),
(2) Date: Jun. 10, 2020

(87) PCT Pub. No.: WO2019/168352
PCT Pub. Date: Sep. 6, 2019

(65) Prior Publication Data
US 2020/0350571 A1    Nov. 5, 2020

(30) Foreign Application Priority Data

Mar. 2, 2018 (KR) .................. 10-2018-0025050
Feb. 26, 2019 (KR) .................. 10-2019-0022738

(51) Int. Cl.
*H01M 4/38*   (2006.01)
*H01M 4/04*   (2006.01)
(Continued)

(52) U.S. Cl.
CPC ......... *H01M 4/386* (2013.01); *H01M 4/0471* (2013.01); *H01M 4/485* (2013.01);
(Continued)

(58) Field of Classification Search
CPC ...... C01B 33/149; C01B 33/20; H01M 4/386; H01M 4/8626; B82Y 30/00;
(Continued)

(56) References Cited

U.S. PATENT DOCUMENTS 11,088,359 B2 *   8/2021   Koike ................ H01M 4/62
2005/0191556 A1   9/2005   Kim et al.
(Continued)

FOREIGN PATENT DOCUMENTS

CN   105226285 A   1/2016
CN   106537659 A   3/2017
(Continued)

OTHER PUBLICATIONS

International Search Report (with partial translation) and Written Opinion issued in corresponding International Patent Application No. PCT/KR2019/002385, dated Jun. 7, 2019.
(Continued)

*Primary Examiner* — Ula C Ruddock
*Assistant Examiner* — Sarika Gupta
(74) *Attorney, Agent, or Firm* — Morgan, Lewis & Bockius LLP (57) ABSTRACT

The present invention relates to a negative electrode active material including a silicon-based composite and a carbon-based material, wherein the silicon-based composite includes $SiO_x$ (0≤x≤2) including pores, a polymer disposed in the pores, and a metal compound disposed on a surface of the $SiO_x$ (0≤x≤2) or on the surface and inside of the $SiO_x$ (0≤x≤2), wherein the metal compound is a compound including at least one element selected from the group
(Continued)

consisting of lithium (Li), magnesium (Mg), calcium (Ca), and aluminum (Al), a method of preparing the same, and a negative electrode and a lithium secondary battery which include the negative electrode active material.

19 Claims, 1 Drawing Sheet

(51) Int. Cl.
*H01M 4/485* (2010.01)
*H01M 4/587* (2010.01)
*H01M 4/02* (2006.01)

(52) U.S. Cl.
CPC ...... *H01M 4/587* (2013.01); *H01M 2004/027* (2013.01); *H01M 2004/028* (2013.01)

(58) Field of Classification Search
CPC .............. C01P 2004/45; C01P 2006/12; C01P 2006/14; Y02E 60/10; Y02E 60/50
See application file for complete search history.

(56) References Cited

U.S. PATENT DOCUMENTS

| | | | |
|---|---|---|---|
| 2013/0045420 A1* | 2/2013 | Biswal | C25F 3/12 252/502 |
| 2014/0087255 A1 | 3/2014 | Kim et al. | |
| 2016/0064731 A1 | 3/2016 | Jung et al. | |
| 2017/0117543 A1 | 4/2017 | Park et al. | |
| 2017/0271651 A1 | 9/2017 | Behan et al. | |
| 2018/0090750 A1 | 3/2018 | Oh et al. | |
| 2018/0159132 A1* | 6/2018 | Gonser | H01M 4/366 |
| 2019/0097220 A1* | 3/2019 | Jung | H01M 4/139 |
| 2020/0194778 A1* | 6/2020 | Troegel | H01M 4/1395 |
| 2021/0184204 A1* | 6/2021 | Oh | H01M 4/0471 |

FOREIGN PATENT DOCUMENTS

| | | |
|---|---|---|
| EP | 3136477 A1 | 3/2017 |
| KR | 10-2005-0071752 A | 7/2005 |
| KR | 10-2010-0036478 A | 4/2010 |
| KR | 10-2014-0039603 A | 4/2014 |
| KR | 10-2014-0147448 A | 12/2014 |
| KR | 10-2015-0128430 A | 11/2015 |
| KR | 10-2016-0001481 A | 1/2016 |
| KR | 10-2016-0028534 A | 3/2016 |
| KR | 10-2016-0070909 A | 6/2016 |
| KR | 10-2017-0048211 A | 5/2017 |
| KR | 10-2017-0090449 A | 8/2017 |

OTHER PUBLICATIONS

Extended European Search Report dated Nov. 27, 2020 issued by the European Patent Office in corresponding European patent application No. 19761325.0.
"A Basic Guide to Particle Characterization," Malvern Instruments Worldwide, White Paper, May 2, 2012, pp. 1-26, XP055089322.

* cited by examiner

NEGATIVE ELECTRODE ACTIVE MATERIAL, METHOD OF PREPARING THE SAME, AND NEGATIVE ELECTRODE AND LITHIUM SECONDARY BATTERY WHICH INCLUDE THE NEGATIVE ELECTRODE ACTIVE MATERIAL

CROSS-REFERENCE TO RELATED APPLICATIONS

This application claims the benefit of Korean Patent Application Nos. 10-2018-0025050, filed on Mar. 2, 2018, and 10-2019-0022738, filed on Feb. 26, 2019, in the Korean Intellectual Property Office, the disclosures of which are incorporated herein in their entirety by reference.

TECHNICAL FIELD

The present invention relates to a negative electrode active material, a method of preparing the negative electrode active material, a negative electrode including the negative electrode active material, and a lithium secondary battery including the negative electrode.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. The negative electrode includes a negative electrode active material in which lithium ions released from the positive electrode are intercalated and deintercalated, and silicon-based particles having high discharge capacity may be used as the negative electrode active material. However, the silicon-based particle, such as $SiO_x$ (0≤x<2), has low initial efficiency, and its volume expands during charge and discharge to increase an area causing a side reaction with an electrolyte solution. Accordingly, there is a limitation in that lifetime of the battery is reduced.

Typically, techniques for forming a coating layer on a surface of the silicon-based particle have been used to address this limitation. For example, a technique of forming a carbon coating layer on the surface of the silicon-based particle is being used. However, excessive volume expansion of the silicon-based particle was not easily suppressed only by the formation of the carbon coating layer, and the low initial efficiency of the silicon-based particle may not be improved.

Thus, there is a need to develop a negative electrode in which initial efficiency may be improved while maintaining high capacity of the secondary battery and life characteristics may be improved by easily suppressing changes in volume during charge and discharge.

DISCLOSURE OF THE INVENTION

Technical Problem

An aspect of the present invention provides a negative electrode active material which may have high capacity and may improve initial efficiency and life characteristics of a battery by including a silicon-based composite in which a polymer is disposed in pores of $SiO_x$ (0≤x≤2) including the pores.

Another aspect of the present invention provides a method of preparing the negative electrode active material.

Another aspect of the present invention provides a negative electrode and a lithium secondary battery which include the negative electrode active material.

Technical Solution

According to an aspect of the present invention, there is provided a negative electrode active material including a silicon-based composite and a carbon-based material, wherein the silicon-based composite includes: $SiO_x$ (0≤x≤2) including pores; a polymer disposed in the pores; and a metal compound disposed on a surface of the $SiO_x$ (0≤x≤2) or on the surface and inside of the $SiO_x$ (0≤x≤2), wherein the metal compound is a compound including at least one element selected from the group consisting of lithium (Li), magnesium (Mg), calcium (Ca), and aluminum (Al).

According to another aspect of the present invention, there is provided a method of preparing a negative electrode active material which includes: mixing $SiO_x$ (0≤x≤2) with at least one element selected from the group consisting of Li, Mg, Ca, and Al and performing a first heat treatment to dispose a metal compound on a surface of the $SiO_x$ (0≤x≤2) or on the surface and inside of the $SiO_x$ (0≤x≤2); immersing the first heat-treated $SiO_x$ (0≤x≤2) in an etching solution to form pores in the $SiO_x$ (0≤x≤2); mixing the $SiO_x$ (0≤x≤2) having the pores formed therein with a polymer and performing a second heat treatment to form a silicon-based composite by disposing the polymer in the pores; and mixing the silicon-based composite and a carbon-based material.

According to another aspect of the present invention, there is provided a negative electrode and a lithium secondary battery which include the negative electrode active material according to the present invention.

Advantageous Effects

A negative electrode active material according to the present invention may improve initial efficiency and life characteristics of a battery by including a silicon-based composite and a carbon-based material.

Also, the negative electrode active material may exhibit high capacity characteristics and may improve initial efficiency characteristics of the battery by disposing a metal compound on a surface of the silicon-based composite or the surface and inside of the $SiO_x$ (0≤x≤2).

In addition, changes in thickness of an electrode may be insignificant by disposing a polymer in pores of the $SiO_x$ (0≤x≤2) including the pores even if a volume of the silicon-based composite expands during charge and discharge, and a side reaction between the silicon-based composite and an electrolyte solution may be prevented by the polymer disposed in the pores so that the life characteristics may be further improved.

DESCRIPTION OF THE SYMBOLS

100: Silicon-based composite
10: Metal compound disposed on a surface of $SiO_x$ ($0 \le x \le 2$) or on the surface and inside of the $SiO_x$ ($0 \le x \le 2$)
20: Pore
30: Polymer

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Negative Electrode Active Material

A negative electrode active material according to the present invention includes a silicon-based composite and a carbon-based material, wherein the silicon-based composite includes: $SiO_x$ ($0 \le x \le 2$) including pores; a polymer disposed in the pores; and a metal compound disposed on a surface of the $SiO_x$ ($0 \le x \le 2$) or on the surface and inside of the $SiO_x$ ($0 \le x \le 2$).

The negative electrode active material includes the silicon-based composite and the carbon-based material, wherein the silicon-based composite and the carbon-based material may be included at a ratio of 1:99 to 50:50, preferably 1:99 to 40:60, more preferably 3:97 to 20:80, and most preferably 3:97 to 10:90. Since the negative electrode active material includes the silicon-based composite and the carbon-based material within the above ratio range, life characteristics of a battery may be improved when the negative electrode active material is used in the battery.

For example, the carbon-based material may include at least one selected from the group consisting of natural graphite, artificial graphite, graphitizable carbon, non-graphitizable carbon, carbon black, and graphite oxide. Preferably, the carbon-based material may include graphite, and, in this case, life characteristics and high-temperature storage performance may be improved when the carbon-based material is used in a battery.

Figure 1:
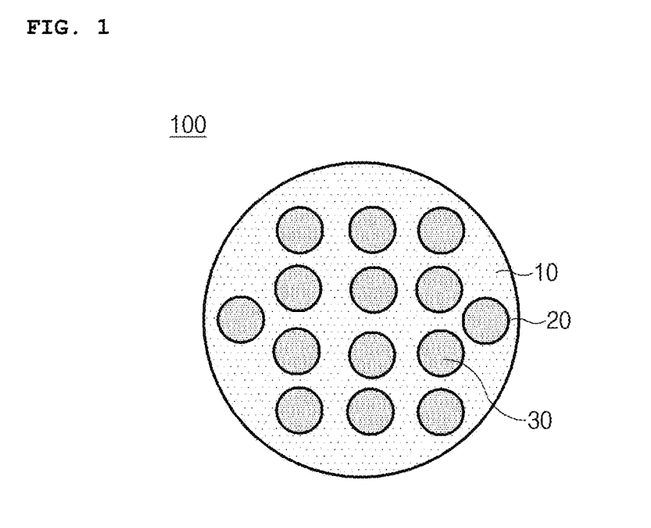
FIG. 1 is a schematic view illustrating a silicon-based composite of the present invention.

FIG. 1 is a schematic view illustrating the silicon-based composite according to the present invention. As illustrated in FIG. 1, the silicon-based composite may include $SiO_x$ ($0 \le x \le 2$) including pores, a polymer disposed in the pores, and a metal compound disposed on a surface of the $SiO_x$ ($0 \le x \le 2$) or on the surface and inside of the $SiO_x$ ($0 \le x \le 2$).

When described in more detail, first, the silicon-based composite may include $SiO_x$ ($0 \le x \le 2$), and, in this case, discharge capacity of a secondary battery may be increased.

Also, since the silicon-based composite includes the metal compound disposed on the surface of the $SiO_x$ ($0 \le x \le 2$) or on the surface and inside of the $SiO_x$ ($0 \le x \le 2$), initial efficiency may be increased and the silicon-based composite may exhibit excellent life characteristics and swelling characteristics.

The metal compound may be included in an amount of 1 wt % to 30 wt %, preferably 3 wt % to 20 wt %, and more preferably 5 wt % to 10 wt % based on a total weight of the silicon-based composite.

Specifically, the metal compound includes metal silicate, and the metal silicate may include at least one selected from the group consisting of $Li_2Si_2O_5$, $Li_2SiO_3$, $Li_4SiO_4$, $Mg_2SiO_4$, $CaSiO_3$, $3Al_2O_3 \cdot 2SiO_2$, and $MgSiO_3$. In a case in which the metal compound includes the above amount of the metal silicate, the initial efficiency of the battery may be improved.

The $SiO_x$ ($0 \le x \le 2$) may have pores having a diameter of 50 nm to 1,000 nm, preferably, 70 nm to 500 nm, and may more preferably have a plurality of pores having a diameter of 100 nm to 300 nm. In a case in which the diameter of the pores of the $SiO_x$ ($0 \le x \le 2$) satisfies the above range, the pores may perform a buffering action even if a volume of the silicon-based composite expands during charge and discharge of the battery. Accordingly, changes in thickness of the electrode due to the volume expansion of the $SiO_x$ ($0 \le x \le 2$) may be suppressed.

In the present invention, the diameter of the pores may be measured by a calculation formula according to the Barrett-Joyer-Halenda (BJH) method using nitrogen ($N_2$) adsorption or by cross-sectional scanning electron microscope (SEM) photography.

Also, the silicon-based composite includes the polymer disposed in the pores of the $SiO_x$ ($0 \le x \le 2$), and the polymer may include at least one selected from polyacrylate and polyacrylic acid, and may more preferably include both the polyacrylate and the polyacrylic acid. Since the polymer is disposed in the pores of the $SiO_x$ ($0 \le x \le 2$), the polymer functions as a blocking layer for suppressing a side reaction with an electrolyte solution even if a reaction area with the electrolyte solution is increased due to an increase in Brunauer-Emmett-Teller (BET) specific surface area of the silicon-based composite as the $SiO_x$ ($0 \le x \le 2$) includes the pores, and thus, the life characteristics may be improved by suppressing the side reaction with the electrolyte solution.

Furthermore, the silicon-based composite may further include a carbon coating layer disposed on the silicon-based composite.

The carbon coating layer may be formed to a thickness of 100 nm to 1,000 nm, for example, 200 nm to 400 nm on the surface of the silicon-based composite. Since the silicon-based composite may improve an electrical contact between particles of the $SiO_x$ ($0 \le x \le 2$) by further including the carbon coating layer and may provide excellent electrical conductivity even after the electrode expands as the charge and discharge proceed, performance of the secondary battery may be further improved. For example, the carbon coating layer may be disposed on the surface of the SiO$_x$ (0≤x≤2), or may be disposed in the internal pores of the SiO$_x$ (0≤x≤2).

The silicon-based composite may have a BET specific surface area of 0.5 m$^2$/g to 2.5 m$^2$/g, for example, 0.8 m$^2$/g to 2.0 m$^2$/g. The silicon-based composite according to the present invention may have the BET specific surface area in the above range by disposing the polymer in the pores as described above, and, in this case, since the pores capable of performing a buffering action during the volume expansion may be sufficiently formed, the life characteristics may be improved. In the present invention, the specific surface area of the silicon-based composite may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

Also, the silicon-based composite may have an average particle diameter (D$_{50}$) of 1 µm to 20 µm, and may preferably have an average particle diameter (D$_{50}$) of 5 µm to 10 µm. In a case in which the average particle diameter of the silicon-based composite particles satisfies the above range, since a path necessary for diffusion of lithium ions is secured, electrode resistance is reduced and the side reaction with the electrolyte solution and the volume expansion of the silicon-based particles may be maintained at an acceptable level, and thus, a battery including the same may exhibit excellent life characteristics. The average particle diameter (D$_{50}$) in the present invention may be defined as a particle diameter at a cumulative volume of 50% in a particle size distribution curve. The average particle diameter (D$_{50}$), for example, may be measured by using a laser diffraction method. The laser diffraction method may generally measure a particle diameter ranging from a submicron level to a few mm and may obtain highly repeatable and high-resolution results.

Method of Preparing Negative Electrode Active Material

Next, a method of preparing a negative electrode active material according to the present invention will be described.

Specifically, the method of preparing a negative electrode active material according to the present invention prepares the negative electrode active material by performing the steps of: mixing SiO$_x$ (0≤x≤2) with at least one element selected from the group consisting of lithium (Li), magnesium (Mg), calcium (Ca), and aluminum (Al) and performing a first heat treatment to dispose a metal compound on a surface of the SiO$_x$ (0≤x≤2) or on the surface and inside of the SiO$_x$ (0≤x≤2); immersing the first heat-treated SiO$_x$ (0≤x≤2) in an etching solution to form pores in the SiO$_x$ (0≤x≤2); mixing the SiO$_x$ (0≤x≤2) having the pores formed therein with a polymer and performing a second heat treatment to form a silicon-based composite by disposing the polymer in the pores; and mixing the silicon-based composite and a carbon-based material.

First, SiO$_x$ (0≤x≤2) is mixed with at least one element selected from the group consisting of Li, Mg, Ca, and Al and the first heat treatment is performed at 400° C. to 1,200° C. for 1 hour to 5 hours, for example, at 600° C. to 1,000° C. for 2 hours to 3 hours. Accordingly, a metal compound may be formed on the surface and/or inside of the silicon-based particle. The metal compound may preferably include metal silicate, and may more preferably include at least one selected from the group consisting of Li$_2$Si$_2$O$_5$, Li$_2$SiO$_3$, Li$_4$SiO$_4$, Mg$_2$SiO$_4$, CaSiO$_3$, 3Al$_2$O$_3$.2SiO$_2$, and MgSiO$_3$. Since the metal compound is formed on the surface and/or inside of the silicon-based particle, initial efficiency of the silicon-based particle may be improved, and excellent life characteristics may be obtained.

Subsequently, the first heat-treated SiO$_x$ (0≤x≤2) is immersed in an etching solution to form pores in the SiO$_x$ (0≤x≤2).

The etching solution may include at least one selected from sodium hydroxide (NaOH) and potassium hydroxide (KOH).

A degree of pore formation in the SiO$_x$ (0≤x≤2) by the etching solution may adjusted by controlling etching time and a concentration of the etching solution.

Preferably, in order for the SiO$_x$ (0≤x≤2) to have pores having a diameter of 50 nm to 1,000 nm, the silicon-based particles are immersed in an etching solution having a concentration of 0.5 M to 5 M, for example, 1 M to 2 M, and etching may then be performed for 1 hour to 5 hours, for example, 2 hours to 3 hours. For example, in a case in which the concentration of the etching solution is less than 0.5 M or the etching time is less than 1 hour, pores may not be sufficiently formed, and in a case in which the concentration of the etching solution is greater than 5 M or the etching time is greater than 5 hours, since the diameter of the pores formed is 1,000 nm or more and, accordingly, the BET specific surface area is increased, there is a concern that the side reaction with the electrolyte solution is increased.

Also, during the preparation of the negative electrode active material according to the present invention, the method may further include forming a carbon coating layer on the SiO$_x$ (0≤x≤2) before the first heat treatment, after the first heat treatment, or after the formation of the pores in the SiO$_x$ (0≤x≤2).

The forming of the carbon coating layer on the surface of the SiO$_x$ (0≤x≤2) may be performed by a heat treatment after mixing the SiO$_x$ (0≤x≤2) with a carbon precursor.

Any carbon precursor may be used without particular limitation as long as it forms carbon by a heat treatment, and the carbon precursor, for example, may include a carbon-containing gas and amorphous or low-crystalline carbon. Specifically, the carbon precursor may include at least one selected from the group consisting of sugars such as glucose, fructose, galactose, maltose, lactose, or sucrose; resins such as a phenolic resin, a naphthalene resin, a polyvinyl alcohol resin, a urethane resin, a polyimide resin, a furan resin, a cellulose resin, an epoxy resin, a polystyrene resin, a resorcinol resin, or a phloroglucinol resin; coal pitch, petroleum pitch, tar, and low molecular weight heavy oil.

The carbon coating layer, for example, may be formed by using a method of carbonizing the amorphous carbon precursor. Both dry and wet mixing may be used as the coating method. Also, the carbon coating layer may be formed by using a deposition method such as a chemical vapor deposition (CVD) method using a carbon-containing gas such as methane, ethane, propane, ethylene, and acetylene.

In the method of preparing a negative electrode active material according to an embodiment of the present invention, a heat treatment temperature for forming the carbon coating layer on the SiO$_x$ (0≤x≤2) may be in a range of 700° C. to 1,500° C., for example, 800° C. to 1,200° C., and heat treatment time may be in a range of about 1 hour to about 5 hours, for example, 2 hours to 3 hours. In a case in which the heat treatment is performed in the above temperature range during the above time, a carbon coating layer with an appropriate crystal structure may be easily formed on the surface of the negative electrode active material.

Also, it is desirable that the heat treatment, for example, is performed in an inert atmosphere in which nitrogen gas, argon gas, helium gas, krypton gas, or xenon gas is present.

Subsequently, the $SiO_x$ ($0 \leq x \leq 2$) having the pores formed therein is mixed with a polymer and a second heat treatment is performed to form a silicon-based composite by disposing the polymer in the pores.

The polymer may include at least one of polyacrylate or polyacrylic acid, and may more preferably include both the polyacrylate and the polyacrylic acid.

The second heat treatment may be performed at 200° C. to 500° C. for 1 hour to 5 hours, for example, at 300° C. to 400° C. for 2 hours to 3 hours. Since the temperature and time of the heat treatment performed are within the above ranges, the polymer may be easily disposed in the pores without worrying about the occurrence of cracks due to the uncured and/or over-cured polymer. For example, in a case in which the second heat treatment is performed at a temperature greater than 500° C., the polymer is thermally decomposed so that the polymer does not easily remain in the pores of the SiOx, and, accordingly, since the BET specific surface area of the silicon-based composite is increased to increase the reaction area with the electrolyte solution when the silicon-based composite is used in the battery, the life characteristics may be degraded.

Furthermore, the polymer may not only be disposed in the pores, but may also be formed on the surface of the $SiO_x$ ($0 \leq x \leq 2$). In a case in which the polymer is further formed on the surface of the $SiO_x$ ($0 \leq x \leq 2$), since the polymer prevents the side reaction between the $SiO_x$ ($0 \leq x \leq 2$) and the electrolyte solution, there is an effect of improving the life characteristics and damage of the silicon-based composite particles may also be prevented due to ductility of the polymer during the volume expansion.

Finally, the silicon-based composite and a carbon-based material are mixed.

In the mixing of the silicon-based composite and the carbon-based material, any method capable of uniformly mixing the silicon-based composite and the carbon-based material may be used without limitation, and specifically, the mixing of the silicon-based composite and the carbon-based material may include mixing the silicon-based composite and the carbon-based material by dry mixing.

Negative Electrode

Next, provided is a negative electrode including the negative electrode active material according to the present invention.

Specifically, the negative electrode includes a negative electrode collector and a negative electrode active material layer which is formed on the negative electrode collector and includes the negative electrode active material according to the present invention.

In this case, since the negative electrode active material is the same as described above, detailed descriptions thereof will be omitted, and the remaining configurations will be only described in detail below.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, the negative electrode collector typically has a thickness of 3 μm to 500 μm, and, similar to a positive electrode collector, the negative electrode collector may have fine surface roughness to improve bonding strength with the negative electrode active material. For example, the negative electrode collector may be used in various shapes such as a film, a sheet, a foil, a net, a porous body, a foam body, a non-woven fabric body, and the like.

The negative electrode active material layer may further selectively include a conductive agent, a binder, and a thickener, if necessary, in addition to the negative electrode active material.

In this case, the negative electrode active material may be included in an amount of 80 wt % to 100 wt %, for example, 85 wt % to 99 wt % based on a total weight of the negative electrode active material layer.

The conductive agent is a component for further improving the conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, or thermal black; conductive fibers such as carbon fibers or metal fibers; fluorocarbon; metal powder such as aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The thickener properly controls viscosity of a composition for forming the negative electrode active material layer, wherein it may include a cellulose-based compound. For example, the cellulose-based compound may include at least one selected from the group consisting of carboxymethyl cellulose, hydroxymethyl cellulose, alcohol-soluble cellulose butyrate, cellulose acetate, cellulose acetate butyrate, cellulose butyrate, cyanoethyl cellulose, methyl cellulose, ethyl cellulose, hydroxyethyl cellulose, ethyl hydroxyethyl cellulose, nitrocellulose, carboxymethyl cellulose sodium, carboxymethyl cellulose ammonium, hydroxyethyl cellulose, hydroxypropyl cellulose, and hydroxypropyl methylcellulose. The thickener may be included in an amount of 1 wt % to 10 wt % based on the total weight of the negative electrode active material.

Also, the negative electrode may be prepared according to a typical method of preparing a negative electrode except that the negative electrode active material according to the present invention is used. For example, a composition for forming a negative electrode active material layer, which is prepared by dissolving or dispersing the negative electrode active material as well as selectively the binder, the conductive agent, and the thickener in a solvent, is coated on the negative electrode collector, and the negative electrode may be prepared by drying and rolling the coated negative electrode collector.

The solvent may be a solvent normally used in the art, and may include dimethyl sulfoxide (DMSO), isopropyl alcohol, N-methylpyrrolidone (NMP), dimethyl formamide (DMF), acetone, or water, and any one thereof or a mixture of two or more thereof may be used. An amount of the solvent used may be sufficient if the solvent may dissolve or disperse the negative electrode active material powder, the conductive agent, the binder, and the dispersant in consideration of a coating thickness of a slurry and manufacturing yield, and may allow to have a viscosity that may provide excellent thickness uniformity during the subsequent coating for the preparation of the negative electrode.

Also, as another method, the negative electrode may be prepared by casting the composition for forming a negative electrode active material layer on a separate support and then laminating a film separated from the support on the negative electrode collector.

Secondary Battery

Furthermore, in the present invention, an electrochemical device including the negative electrode may be prepared. The electrochemical device may specifically be a battery or a capacitor, and, for example, may be a lithium secondary battery.

The lithium secondary battery may specifically include a negative electrode, a positive electrode disposed to face the negative electrode, a separator disposed between the negative electrode and the positive electrode, and an electrolyte. Since the negative electrode is the same as described above, detailed descriptions thereof will be omitted, and the remaining configurations will be only described in detail below.

Also, the lithium secondary battery may further selectively include a battery container accommodating an electrode assembly of the negative electrode, the positive electrode, and the separator, and a sealing member sealing the battery container.

The positive electrode includes a positive electrode collector and a positive electrode active material layer disposed on the positive electrode collector.

The positive electrode collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 µm to 500 µm and may have a surface with fine roughness to improve adhesion to the positive electrode active material. The positive electrode collector may be used in various shapes, for example, a film, a sheet, a foil, a net, a porous body, a foam body, a non-woven fabric body, and the like.

The positive electrode active material layer may further selectively include a binder and a conductive agent as well as the positive electrode active material.

Any positive electrode active material may be used as the positive electrode active material without particular limitation as long as it is typically used as a positive electrode active material, and, specifically, the positive electrode active material may include a layered compound, such as lithium cobalt oxide ($LiCoO_2$) or lithium nickel oxide ($LiNiO_2$), or a compound substituted with one or more transition metals; lithium manganese oxides such as $Li_{1+y1}Mn_{2-y1}O_4$ ($0 \leq y1 \leq 0.33$), $LiMnO_3$, $LiMn_2O_3$, and $LiMnO_2$; lithium copper oxide ($Li_2CuO_2$); vanadium oxides such as $LiV_3O_8$, $Li_3VO_4$, $V_2O_5$, and $Cu_2V_2O_7$; nickel (Ni)-site type lithium nickel oxide expressed by a chemical formula of $LiNi_{1-y2}M_{y2}O_2$ (where M is at least one selected from the group consisting of cobalt (Co), manganese (Mn), aluminum (Al), copper (Cu), iron (Fe), magnesium (Mg), boron (B), and gallium (Ga), and $0.01 \leq y2 \leq 0.3$); lithium manganese composite oxide expressed by a chemical formula of $LiMn_{2-y3}M_{y3}O_2$ (where M is at least one selected from the group consisting of Co, Ni, Fe, chromium (Cr), zinc (Zn), and tantalum (Ta), and $0.01 \leq y \leq 30.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The conductive agent included in the positive electrode active material layer is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the binder included in the positive electrode active material layer functions to improve binding between positive electrode active material particles and adhesion between the positive electrode active material and the positive electrode collector. Specific examples of the positive electrode binder may be polyvinylidene fluoride (PVDF), a polyvinylidene fluoride-hexafluoropropylene copolymer (PVDF-co-HEP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The positive electrode active material layer, for example, may be prepared by coating a composition for forming a positive electrode active material layer, which is prepared by dissolving or dispersing selectively the binder and the conductive agent as well as the positive electrode active material in a solvent, on the positive electrode collector and drying the coated positive electrode collector, or may be prepared by casting the composition for forming a positive electrode active material layer on a separate support and then laminating a film separated from the support on the positive electrode collector.

In the lithium secondary battery, the separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

Furthermore, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, glyme, hexamethyl phosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the negative electrode for a secondary battery according to the present invention exhibits excellent life characteristics due to a reduction in thickness expansion of the electrode even if charge and discharge cycles proceed, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1 silicon oxide having an average particle diameter ($D_{50}$) of 6 μm was mixed with magnesium (Mg) powder in a ratio of 10:1 and the mixture was heat-treated at 950° C. for 2 hours to prepare silicon oxide particles including metal compounds represented by $MgSiO_3$ and $Mg_2SiO_4$. In this case, the metal compounds were included in an amount of 8 wt % based on a total weight of the silicon oxide particles.

Figure 2:
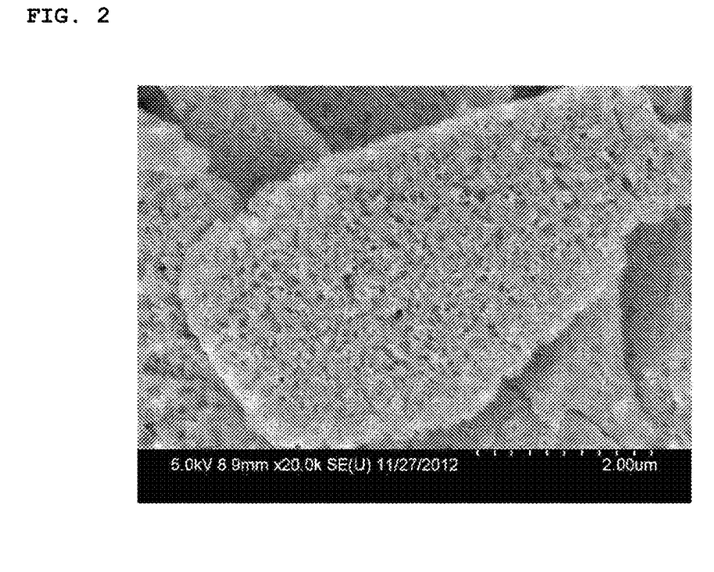
FIG. 2 is a cross-sectional scanning electron microscope (SEM) image of a SiO particle prepared in Example 1.

Subsequently, the silicon oxide particles including $MgSiO_3$ and $Mg_2SiO_4$ were immersed in a 1 M NaOH solution for 3 hours to form pores in the silicon oxide particles including $MgSiO_3$ and $Mg_2SiO_4$. After the pores were formed, in order to determine an average pore diameter of the silicon oxide particles including $MgSiO_3$ and $Mg_2SiO_4$, the particle was cut using a focused ion beam (FIB), a cross-sectional image of the silicon oxide particle having the pores formed therein and including $MgSiO_3$ and $Mg_2SiO_4$ was taken using a scanning electron microscope, and it was confirmed that the average pore diameter was 300 nm as in FIG. 2.

A mixed material was prepared in which polyacrylate and polyacrylic acid were mixed in a ratio of 1:1. Subsequently, the mixed material and an N-methylpyrrolidone (NMP) solvent were mixed in a ratio of 1:9 to prepare a solution in which the mixed material was dissolved. The silicon oxide particles having the pores formed therein and including $MgSiO_3$ and $Mg_2SiO_4$ were added to the entire NMP solution, in which the mixed material was dissolved, in a ratio (v/v %) of 85:15 and heat-treated at 300° C. for 2 hours to prepare a silicon-based composite (weight ratio of silicon oxide:the mixed material=10:1) in which the mixed material of polyacrylate and polyacrylic acid was disposed in the pores of the silicon oxide particles having the pores formed therein and including $MgSiO_3$ and $Mg_2SiO_4$.

A mixed negative electrode active material, in which the above-prepared silicon-based composite and graphite were mixed in a weight ratio of 1:9, a carbon black conductive agent, a carboxylmethyl cellulose (CMC) binder, and a styrene butadiene rubber binder were mixed in a weight ratio of 95.8:1:1.7:1.5 to prepare 5 g of a mixture. 2 g of distilled water was added to the mixture to prepare a negative electrode slurry.

The negative electrode slurry was coated on a 20 µm thick copper thin film and dried. In this case, a temperature of circulating air was 60° C. Subsequently, the coated copper thin film was roll-pressed, dried in a vacuum oven at 130° C. for 12 hours, and then punched into a circle having an area of 1.4875 cm² to prepare a negative electrode.

Example 2

The silicon oxide particles having the pores with an average pore diameter of 300 nm formed therein and including $MgSiO_3$ and $Mg_2SiO_4$, which were prepared in Example 1, were mixed with pitch in a ratio of 85:15 and the mixture was heat-treated at 950° C. for 2 hours to form a carbon coating layer on surfaces of the silicon oxide particles having the pores formed therein and including $MgSiO_3$ and $Mg_2SiO_4$. Subsequently, a silicon-based composite, in which a mixture of polyacrylate and polyacrylic acid was disposed in the pores of the above-prepared silicon oxide particles having the pores formed therein, including $MgSiO_3$ and $Mg_2SiO_4$, and having the carbon coating layer formed on the surfaces thereof, was prepared in the same manner as in Example 1, and a negative electrode active material and a negative electrode were prepared in the same manner as in Example 1 except that the silicon-based composite was used.

Example 3

The silicon oxide particles having the pores formed therein and including $MgSiO_3$ and $Mg_2SiO_4$, which were prepared in Example 1, were mixed with polyacrylate and the mixture was heat-treated at 300° C. for 2 hours to prepare a silicon-based composite in which the polyacrylate was disposed in the pores of the silicon oxide particles having the pores formed therein and including $MgSiO_3$ and $Mg_2SiO_4$. A negative electrode was prepared in the same manner as in Example 1 except that the silicon-based composite was used.

Example 4

The silicon oxide particles having the pores formed therein and including $MgSiO_3$ and $Mg_2SiO_4$, which were prepared in Example 1, were mixed with pitch in a ratio of 85:15 and the mixture was heat-treated at 950° C. for 2 hours to form a carbon coating layer on surfaces of the silicon oxide particles. Subsequently, a silicon-based composite, in which polyacrylate was disposed in the pores of the above-prepared silicon oxide particles having the pores formed therein, including $MgSiO_3$ and $Mg_2SiO_4$, and having the carbon coating layer formed on the surfaces thereof, was prepared in the same manner as in Example 3, and a negative electrode active material and a negative electrode were prepared in the same manner as in Example 3 except that the silicon-based composite was used.

Example 5

The silicon oxide particles having the pores formed therein and including $MgSiO_3$ and $Mg_2SiO_4$, which were prepared in Example 1, were mixed with polyacrylate and the mixture was heat-treated at 600° C. for 2 hours to prepare a silicon-based composite. A negative electrode was prepared in the same manner as in Example 1 except that the silicon-based composite was used.

Comparative Example 1

A negative electrode was prepared in the same manner as in Example 1 except that a mixture, in which silicon oxide particles and graphite were mixed in a ratio of 1:9, was used as a negative electrode active material.

Comparative Example 2 silicon oxide having an average particle diameter ($D_{50}$) of 6 µm was mixed with Mg powder in a ratio of 10:1, and the mixture was heat-treated at 950° C. for 2 hours to prepare silicon oxide particles including metal compounds represented by $MgSiO_3$ and $Mg_2SiO_4$. In this case, the metal compounds were included in an amount of 8 wt % based on a total weight of the silicon oxide particles.

A negative electrode was prepared in the same manner as in Example 1 except that a mixture, in which the silicon oxide particles including $MgSiO_3$ and $Mg_2SiO_4$ and graphite were mixed in a ratio of 1:9, was used as a negative electrode active material.

Comparative Example 3

Silicon oxide particles were mixed with pitch in a ratio of 85:15 and the mixture was heat-treated at 1,000° C. for 2 hours to form a carbon coating layer on surfaces of the silicon oxide particles (weight ratio of silicon oxide:carbon=10:1). A negative electrode was prepared in the same manner as in Example 1 except that a mixture, in which the silicon oxide particles having the carbon coating layer formed thereon and graphite were mixed in a ratio of 1:9, was used as a negative electrode active material.

Comparative Example 4

Silicon oxide particles were mixed with an entire NMP solution, in which polyacrylate was dissolved, in a ratio of 85:15 and the mixture was heat-treated at 300° C. for 2 hours to form a polymer coating layer on surfaces of the silicon oxide particles (weight ratio of silicon oxide:polyacrylate=10:1). A negative electrode was prepared in the same manner as in Example 1 except that a mixture, in which the silicon oxide particles having the polymer coating layer formed thereon and graphite were mixed in a ratio of 1:9, was used as a negative electrode active material.

Comparative Example 5

Silicon oxide particles were immersed in a NaOH solution having a concentration of 1 mol % for 3 hours to prepare SiO particles having an average pore diameter of 300 nm. A negative electrode was prepared in the same manner as in Example 1 except that a mixture, in which the silicon oxide particles having the pores formed therein and graphite were mixed in a ratio of 1:9, was used as a negative electrode active material.

Experimental Example 1: Analysis of Negative Electrode Active Material

Pore diameters of the silicon oxide particles respectively prepared in Examples 1 to 5 and Comparative Examples 1 to 5 and average particle diameters ($D_{50}$) and BET specific surface areas of the silicon-based composites were measured as follows, and the results thereof are presented in Table 1 below.

(1) Pore Diameter of Silicon Oxide Particle

A pore diameter of the silicon oxide particle may be measured by cross-sectional analysis of the particle using a focused ion beam (FIB). Specifically, when the silicon-based composite particles were prepared in Examples 1 to 5 and Comparative Example 5, the silicon oxide particles were etched to extract the silicon oxide particles having the pores formed therein. The silicon oxide particle was cut using a focused ion beam, a cross-sectional image was taken using a scanning electron microscope (SEM), the pore diameter of the silicon oxide particle was then measured using the cross-sectional image, and the results thereof are presented in Table 1 below.

(2) Average Particle Diameter ($D_{50}$)

After each of the silicon-based composite was introduced into a laser diffraction particle size measurement instrument (e.g., Microtrac MT 3000) and irradiated with ultrasonic waves having a frequency of about 28 kHz and an output of 60 W, an average particle diameter ($D_{50}$) at 50% in a cumulative particle diameter distribution of the measurement instrument was calculated and presented in Table 1 below.

(3) BET Specific Surface Area ($m^2/g$)

A specific surface area of the silicon-based composite was measured by a Brunauer-Emmett-Teller (BET) method, wherein, specifically, the specific surface area was calculated from a nitrogen gas adsorption amount at a liquid nitrogen temperature (77K) using BELSORP-mini II by Bell Japan Inc. and presented in Table 1.

TABLE 1

| | Average pore diameter (nm) | BET specific surface area ($m^2/g$) | Average particle diameter ($D_{50}$) (μm) |
|---|---|---|---|
| Example 1 | 300 | 1 | 6 |
| Example 2 | 300 | 0.8 | 6 |
| Example 3 | 300 | 0.9 | 6 |
| Example 4 | 300 | 0.8 | 6 |
| Example 5 | 300 | 3 | 6 |
| Comparative Example 1 | — | 4 | 6 |
| Comparative Example 2 | — | 5 | 6 |
| Comparative Example 3 | — | 3 | 6 |
| Comparative Example 4 | — | 1 | 6 |
| Comparative Example 5 | 300 | 7 | 6 |

As illustrated in Table 1, the silicon oxide particles prepared in Examples 1 to 4 included the pores having an average diameter of 300 nm, and it may be confirmed that, since the polymer was disposed in the pores of the silicon oxide particles, the silicon oxide particles had a BET specific surface area of 0.8 $m^2/g$ to 1 $m^2/g$. However, since the second heat treatment temperature of the silicon oxide particles prepared in Example 5 was relatively high to thermally decompose the polymer, the polymer did not easily remain in the pores of the silicon oxide particles, and thus, it may be confirmed that the BET specific surface area of the silicon oxide particles was higher than those of Examples 1 to 4.

Experimental Example 2: Characterization of Secondary Battery

Half-cells and full-cells were prepared by using the negative electrodes respectively prepared in Examples 1 to 5 and Comparative Examples 1 to 5 and then charged and discharged to evaluate initial efficiency and capacity retention, and the results thereof are presented in Table 2 below.

Specifically, the half-cells were prepared by using the negative electrodes respectively prepared in Examples 1 to 5 and Comparative Examples 1 to 5, and initial efficiencies of batteries were measured using the half-cells.

In the preparation of the half-cells, each of the negative electrodes respectively prepared in Examples 1 to 5 and Comparative Examples 1 to 5 was used and a lithium metal thin film cut into a circle of area 1.7671 $cm^2$ was used as a positive electrode. A porous polyethylene separator was disposed between the positive electrode and the negative electrode, and the coin-type half-cell was prepared by injecting an electrolyte solution in which 0.5 wt % vinylene carbonate was dissolved and 1 M $LiPF_6$ was dissolved in a mixed solution in which a mixing volume ratio of ethyl methyl carbonate (EMC) to ethylene carbonate was 7:3.

Each of the above-prepared coin-type half-cells was charged at a constant current of 0.5 C to 4.25 V and cut-off charged at 0.05 C. Thereafter, each coin-type half-cell was discharged at a constant current of 0.5 C to a voltage of 2.5 V, and initial efficiency (%) was derived from the results during the first charge and discharge cycle.

Specifically, the initial efficiency (%) was derived by the following calculation.

Initial efficiency (%)=(discharge capacity after the $1^{st}$ discharge/$1^{st}$ charge capacity)×100

Also, the full-cells were prepared by using the negative electrodes respectively prepared in Examples 1 to 5 and Comparative Examples 1 to 5, and life characteristics of batteries were measured using the full-cells.

In the preparation of the full-cells, after each of the negative electrodes respectively prepared in Examples 1 to 5 and Comparative Examples 1 to 5 and a positive electrode prepared as described below were stacked with a polyethylene separator to prepare an electrode assembly, and a lithium secondary battery was prepared by putting the electrode assembly in a battery case and injecting an electrolyte solution in which 1 M LiPF$_6$ was dissolved in an organic solvent in which ethylene carbonate (EC) and ethyl methyl carbonate (EMC) were mixed in a ratio of 3:7.

In this case, a mixture, in which lithium cobalt oxide (LiCoO$_2$) as positive electrode active material particles, a carbon black conductive agent, and a polyvinylidene fluoride (PVDF) binder were mixed in a weight ratio of 90:5:5, was added to N-methyl-2-pyrrolidone (NMP), as a solvent, at a weight ratio of 100:40 to prepare a positive electrode active material slurry. A 100 μm thick aluminum thin film was coated with the positive electrode active material slurry, dried, and then roll-pressed to prepare the positive electrode.

Each of the above-prepared full-cells was charged at a constant current of 0.5 C to 4.25 V and cut-off charged at 0.05 C. Thereafter, each full-cell was discharged at a constant current of 0.5 C to a voltage of 2.5 V. The charging and discharging were set as one cycle, this cycle was repeated 100 times, and the results thereof are presented in Table 2 below.

TABLE 2

|  | Initial efficiency (%) | Capacity retention after 100 cycles (%) |
| --- | --- | --- |
| Example 1 | 91 | 94.5 |
| Example 2 | 90 | 95 |
| Example 3 | 91 | 93 |
| Example 4 | 90 | 94 |
| Example 5 | 90 | 91 |
| Comparative Example 1 | 88 | 86 |
| Comparative Example 2 | 90 | 90 |
| Comparative Example 3 | 86 | 90 |
| Comparative Example 4 | 86 | 88 |
| Comparative Example 5 | 83 | 76 |

As illustrated in Table 2, it may be confirmed that both initial efficiencies and capacity retentions after 100 cycles of the secondary batteries respectively including the negative electrodes prepared in Examples 1 to 5 were better than those of the secondary batteries prepared in Comparative Examples 1 to 5. Particularly, with respect to the secondary battery including the negative electrode of Comparative Example 4, since it was not easy to suppress volume expansion of the silicon oxide particles due to charge and discharge by coating the surfaces of the silicon oxide particles with the polymer, a damage, such as cracks in the silicon oxide particles due to the volume expansion of the silicon oxide particles, occurred, and thus, it may be confirmed that both the initial efficiency and the capacity retention were lower than those of Examples 1 to 5. Also, in a case in which pores were formed in the surface of the silicon oxide as in Comparative Example 5, the BET specific surface area of the negative electrode active material was increased to increase a reaction area with the electrolyte solution, and, accordingly, the capacity retention was reduced in comparison to those of Examples 1 to 5.

The invention claimed is:

1. A negative electrode active material comprising a silicon-based composite and a carbon-based material,
wherein the silicon-based composite comprises:
SiO$_x$ (0≤x≤2) including pores;
a polymer disposed in the pores; and
a metal compound disposed on a surface of the SiOx or on the surface and interior of the SiO$_x$,
wherein the metal compound comprises at least one element selected from the group consisting of lithium (Li), magnesium (Mg), calcium (Ca), and aluminum (Al),
the polymer comprises polyacrylate, and
the silicon-based composite has a Brunauer-Emmett-Teller (BET) specific surface area of 0.5 m$^2$/g to 2.5 m$^2$/g.

2. The negative electrode active material of claim 1, wherein a ratio of the silicon-based composite to the carbon-based material is 1:99 to 50:50.

3. The negative electrode active material of claim 1, wherein the carbon-based material comprises at least one selected from the group consisting of natural graphite, artificial graphite, graphitizable carbon, non-graphitizable carbon, carbon black, and graphite oxide.

4. The negative electrode active material of claim 1, wherein the SiO$_x$ has a plurality of pores having a diameter of 50 nm to 1,000 nm.

5. The negative electrode active material of claim 1, wherein the metal compound comprises at least one metal silicate selected from the group consisting of Li$_2$Si$_2$O$_5$, Li$_2$SiO$_3$, Li$_4$SiO$_4$, Mg$_2$SiO$_4$, CaSiO$_3$, 3Al$_2$O$_3$·2SiO$_2$, and MgSiO$_3$.

6. The negative electrode active material of claim 1, wherein the metal compound is included in an amount of 1 wt % to 30 wt % based on a total weight of the silicon-based composite.

7. The negative electrode active material of claim 1, wherein the polymer further comprises polyacrylic acid.

8. The negative electrode active material of claim 1, wherein the silicon-based composite further comprises a carbon coating layer disposed on the silicon-based composite.

9. The negative electrode active material of claim 1, wherein the silicon-based composite has an average particle diameter (D$_{50}$) of 1 μm to 20 μm.

10. A method of preparing the negative electrode active material according to claim 1, the method comprising:
mixing SiO$_x$ (0≤x≤2) with at least one element selected from the group consisting of lithium (Li), magnesium (Mg), calcium (Ca), and aluminum (Al) and performing a first heat treatment to dispose a metal compound on a surface of the SiO$_x$ or on the surface and interior of the SiO$_x$;
immersing the first heat-treated SiO$_x$ in an etching solution to form pores in the SiO$_x$;
mixing the SiO$_x$ having the pores formed therein with a polymer and performing a second heat treatment to form a silicon-based composite by disposing the polymer in the pores; and
mixing the silicon-based composite and a carbon-based material,
wherein the polymer comprises polyacrylate.

11. The method of claim 10, wherein the first heat treatment is performed at 400° C. to 1,200° C. for 1 hour to 5 hours.

12. The method of claim 10, wherein the etching solution comprises at least one selected from sodium hydroxide (NaOH) and potassium hydroxide (KOH).

13. The method of claim 10, wherein the polymer further comprises polyacrylic acid.

14. The method of claim 10, wherein the second heat treatment is performed at 200° C. to 500° C. for 1 hour to 5 hours.

15. The method of claim 10, further comprising forming a carbon coating layer on the $SiO_x$ before the first heat treatment, after the first heat treatment, or after the formation of the pores in the $SiO_x$.

16. A negative electrode comprising the negative electrode active material of claim 1.

17. A secondary battery comprising:
the negative electrode of claim 16;
a positive electrode;
a separator disposed between the positive electrode and the negative electrode; and
an electrolyte.

18. The negative electrode active material of claim 1, wherein the metal compound comprises at least one metal silicate selected from the group consisting of $Mg_2SiO_4$ and $MgSiO_3$.

19. The method of claim 10, wherein the second heat treatment is performed at 300° C. to 400° C. for 2 hours to 3 hours.

* * * * *